United States Patent
Renollett et al.

(10) Patent No.: US 11,566,712 B2
(45) Date of Patent: Jan. 31, 2023

(54) CONTROL VALVE SEAT AND SEAT SUPPORT

(71) Applicant: TESCOM CORPORATION, Elk River, MN (US)

(72) Inventors: Jacob T. R. Renollett, Andover, MN (US); Todd W. Larsen, Milaca, MN (US)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 16/961,999

(22) PCT Filed: Dec. 6, 2019

(86) PCT No.: PCT/US2019/064919
§ 371 (c)(1),
(2) Date: Jul. 14, 2020

(87) PCT Pub. No.: WO2020/118174
PCT Pub. Date: Jun. 11, 2020

(65) Prior Publication Data
US 2021/0285551 A1 Sep. 16, 2021

Related U.S. Application Data
(60) Provisional application No. 62/776,949, filed on Dec. 7, 2018.

(51) Int. Cl.
*F16K 31/122* (2006.01)
*F16K 1/42* (2006.01)
*F16K 1/38* (2006.01)

(52) U.S. Cl.
CPC ............ *F16K 1/427* (2013.01); *F16K 1/38* (2013.01); *F16K 31/1221* (2013.01)

(58) Field of Classification Search
CPC ...... F16K 1/427; F16K 1/385; F16K 31/1221; F16K 39/02; F16K 27/02; F16K 1/46; F16K 1/38
See application file for complete search history.

(56) References Cited

U.S. PATENT DOCUMENTS 2,918,078 A   12/1959   Cummings
3,327,991 A * 6/1967   Wallace .................. F16K 1/385
                                                          251/172

(Continued)

FOREIGN PATENT DOCUMENTS

CH        378626 A      6/1964

OTHER PUBLICATIONS

International Search Report and Written Opinion, corresponding International Application No. PCT/US2019/064919, dated Mar. 20, 2020.

*Primary Examiner* — Umashankar Venkatesan
(74) *Attorney, Agent, or Firm* — Marshall, Gerstein & Borun LLP (57) ABSTRACT

A high pressure fluid control device includes a valve body defining an inlet, an outlet, and a throat disposed between the inlet and the outlet. The valve body defines a longitudinal axis. A valve seat is disposed in the throat and includes a sloped surface. A seat support is disposed in the throat and is adjacent to the valve seat. The seat support includes a sloped surface adjacent to the sloped surface of the valve seat. A control element is disposed in the valve body and includes a stem and a seating surface. The control element is movable between an open position, in which the seating surface is spaced away from the valve seat, and a closed position, in which the seating surface engages the valve seat. The sloped surface of the seat support provides a rigid support to the valve seat to resist deformation of the valve seat.

17 Claims, 6 Drawing Sheets

(56) References Cited

U.S. PATENT DOCUMENTS

| | | | | |
|---|---|---|---|---|
| 4,333,527 A | * | 6/1982 | Higgins | E21B 43/123 |
| | | | | 166/117.5 |
| 4,445,532 A | | 5/1984 | Mitchell | |
| 2010/0133460 A1 | * | 6/2010 | Durant | G05D 16/0666 |
| | | | | 251/359 |

* cited by examiner

FIG. 10

CONTROL VALVE SEAT AND SEAT SUPPORT

FIELD OF DISCLOSURE

The present disclosure generally relates to a fluid control device, more particularly, a valve seat and seat support for a fluid control device.

BACKGROUND

Plants and factories utilize process control devices to control the flow of fluids in processes, wherein "fluids" may include liquids, gases, or any mixture that can flow through a pipe. Manufacturing processes that create consumer articles or goods such as fuel, food, and clothes require control valves to control and regulate fluid flow. Even a medium sized factory may utilize hundreds of control valves to control a process. Control valves have been utilized for over a century, during which time valve designers have continuously improved the operational performance of control valves.

Figure 1:
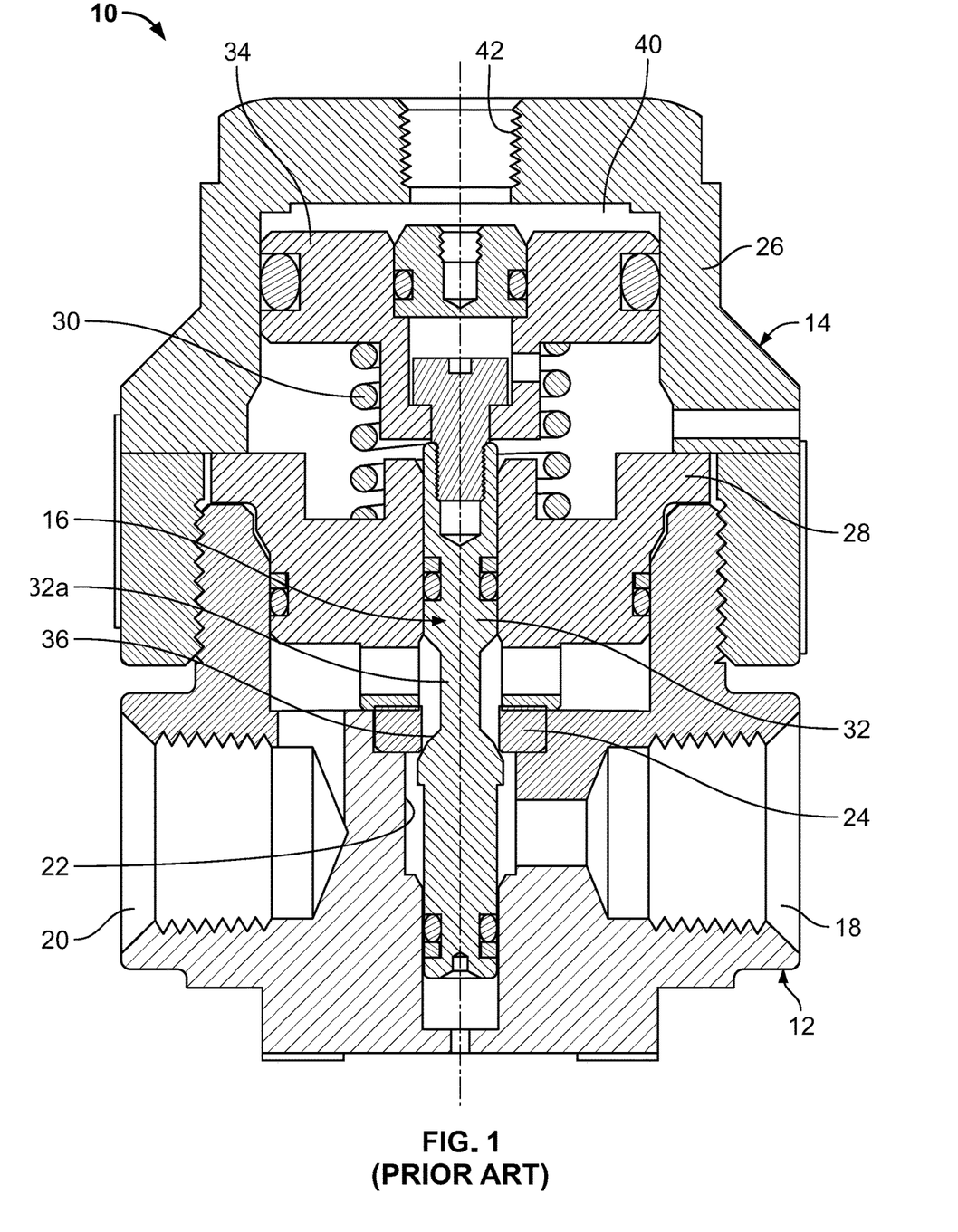
FIG. 1 is a cross-sectional side view of a conventional control valve.

FIG. 1 depicts one example of a conventional bi-directional control valve 10. More particularly, the bi-directional control valve 10 of FIG. 1 includes an air-operated bi-directional control valve 10 in that a pneumatic supply is used to control the control valve 10. The conventional bi-directional control valve 10 generally includes a valve body 12 and an actuator assembly 14. The actuator assembly 14 contains a control element 16 that is adapted for sliding displacement within the valve body 10 between a closed position, which is illustrated in FIG. 1, and an open position (not shown).

More specifically, the valve body 12 includes an inlet 18, an outlet 20, and a throat 22. The throat 22 carries a valve seat 24 for being engaged by the control element 16 to close the valve 10, as depicted. The actuator assembly 14, as mentioned, includes the control element 16. Additionally, the actuator assembly 14 includes a housing 26, a valve insert 28, and a spring 30. The control element 16 generally includes a stem portion 32 and a piston 34. The stem portion 32 extends through the throat 22 of the valve body 12 and includes a reduced diameter portion 32a defining a seating surface 36. The seating surface 36 engages the valve seat 24 when the control element 16 is in the closed position.

The spring 30 is disposed between the valve insert 28 and the piston 34 such as to bias the piston 34, and therefore the control element 16, upward relative to the orientation of the valve 10 of FIG. 1, and into the closed position. As depicted in FIG. 1, the piston 34 of the control element 16 is slidably disposed within a piston cavity 40 defined by the housing 26. The housing 26 additionally defines a threaded aperture 42 for threadably receiving a supply line (not shown) connected to a pneumatic supply, for example, a source of compressed shop-air supplied at a pressure of between approximately eighty (80) psig and approximately one-hundred and fifty (150) psig. The force required to move the piston 34 is a function of the surface area of the piston 34. In the disclosed conventional valve 10, the piston 34 includes a diameter of approximately one and three-hundred and seventy-five thousands of an inch (1.375"). This provides a surface area sufficient for the compressed shop-air to displace the piston 34 as required.

The position of the control element 16 within the control valve 10 can be controlled by introducing compressed air into the piston cavity 40. For example, in the absence of compressed air supplied to the cavity 40, the spring 30 biases the piston 34 into the position depicted in FIG. 1, which causes the seating surface 36 of the stem portion 32 to sealingly engage the valve seat 24 and close the valve 10. However, the introduction of compressed air into the cavity 40 increases the pressure in the cavity 40 above the piston 34, which then causes the piston 34 and the entire control element 16 to displace downward relative to the orientation of the valve depicted in FIG. 1. Accordingly, the seating surface 36 of the stem portion 32 disengages from the valve seat 24 and opens the valve 10 to allow fluid to flow therethrough.

In some conventional applications, when the valve 10 is closed, as depicted in FIG. 1, the fluid process is such that pressure remains built up within the system. As mentioned above, in the absence of compressed air being supplied to the piston cavity 40 of the housing 26, the spring 30 biases the control element 16 into the closed position, as depicted in FIG. 1, such that the seating surface 36 seats against the valve seat 24.

SUMMARY

In accordance with a first exemplary aspect, a high pressure fluid control device may include a valve body defining an inlet, an outlet, and a throat disposed between the inlet and the outlet. The valve body may define a longitudinal axis. A valve seat may be disposed in the throat of the valve body and includes a sloped surface. A seat support may be disposed in the throat and may be adjacent to the valve seat. The seat support may include a sloped surface adjacent to the sloped surface of the valve seat. A control element may be disposed in the valve body and may include a stem and a seating surface. The control element may be movable relative to the longitudinal axis between an open position, in which the seating surface is spaced away from the valve seat, and a closed position, in which the seating surface engages the valve seat. The sloped surface of the seat support may provide a rigid support to the valve seat to resist deformation of the valve seat.

In accordance with a second exemplary aspect, a valve seat assembly for a fluid control device may include a valve body defining a bore and a longitudinal axis. A valve seat may be disposed in the bore and operatively coupled to the valve body. The valve seat may include an inner portion and a bore defining a sloped surface adjacent to the inner portion. The inner portion may extend into the bore of the valve body. A seat support may be operatively coupled to the valve body and may be coaxial with the longitudinal axis. The seat support may include a sloped outer surface adjacent to the sloped surface of the valve seat. A valve stem may be slidably disposed within the bore of the valve body. The valve stem may be operatively coupled to a control element having a seating surface. The seating surface may be arranged to engage with the valve seat. The seat support may contact the inner portion of the valve seat to prevent the valve seat from deforming under a compressive load.

In accordance with a third exemplary aspect, a high pressure fluid control device may include a valve body defining an inlet, and outlet, a bore, and a throat disposed between the inlet and the outlet. A valve seat may have an inner portion, an outer portion, and a bore defining a sloped surface. The outer portion may be operatively coupled to the throat of the valve body and the inner portion may extend into the bore of the valve body. A seat support may be mounted in the throat of the valve body and may be adjacent to the valve seat. The seat support may include a sloped surface disposed adjacent to the sloped mating surface of the valve seat. A control element may be disposed in the valve body and may include a stem and a seating surface. The control element may be movable between an open position, in which the seating surface is spaced away from the inner portion of the valve seat, and a closed position, in which the seating surface engages the inner portion of the valve seat. The sloped surfaces of the valve seat and the seat support may be coupled such that the inner portion of the valve seat resists deformation when the control element is in the closed position.

In further accordance with any one or more of the foregoing first, second, and third aspects, a fluid regulator and/or a method of assembling a fluid regulator may further include any one or more of the following preferred forms.

In a preferred form, the sloped surface of the seat support may be supplementary to the sloped surface of the valve seat.

In a preferred form, the valve seat may be an annular ring defining a bore, a first parallel surface, and a second parallel surface.

In a preferred form, the bore may define the sloped surface extending between the first parallel surface and the second parallel surface.

In a preferred form, the seat support may include a flange portion and a protruding portion defining the sloped surface of the seat support.

In a preferred form, the protruding portion may extend from the flange portion.

In a preferred form, the protruding portion may extend into the bore defined by the valve seat.

In a preferred form, the protruding portion may have a concave outer surface that is shaped to mate with the sloped surface of the valve seat.

In a preferred form, the sloped surface of the valve seat may be convex.

In a preferred form, the protruding portion may have a convex outer surface that is shaped to mate with the sloped surface of the valve seat.

In a preferred form, the sloped surface of the valve seat may be concave.

In a preferred form, the support seat may include a bore sized to receive a portion of the control element.

In a preferred form, the bore is angled relative to the longitudinal axis.

In a preferred form, the seat support may be a metallic material and the valve seat is a different material.

In a preferred form, the valve seat may be Vespel.

In a preferred form, the valve body may include a first body portion and a second body portion.

In a preferred form, the valve seat may be mounted between the first body portion and the second body portion.

In a preferred form, the protruding portion may extend into the bore defined by the valve seat.

In a preferred form, the sloped surface of the seat support may define a frustoconical protruding portion.

In a preferred form, the bore of the valve seat may be sized and shaped to receive and engage the frustoconical protruding portion of the seat support.

In a preferred form, the seat support may be a first material and the valve seat may be a second material different than the first material.

In a preferred form, the first material may have a higher compressive strength than the second material.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

DETAILED DESCRIPTION

Figure 2:
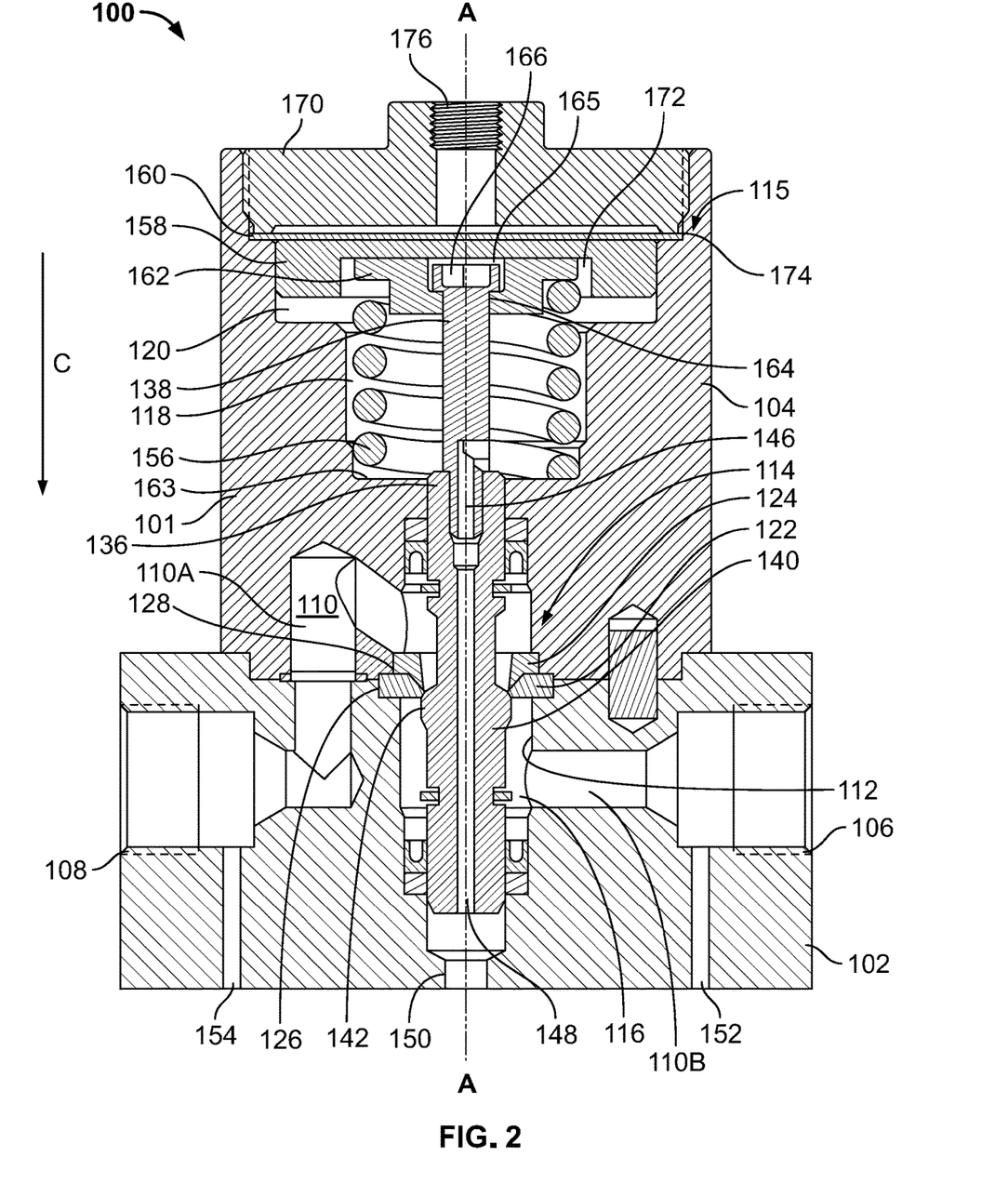
FIG. 2 is a cross-sectional side view of a first exemplary control valve constructed in accordance with the teachings of the present disclosure.

Referring now to the drawings, FIG. 2 illustrates a first exemplary control valve 100 constructed in accordance with the teachings of the present disclosure. The control valve 100 includes a valve body 101 having both lower body (i.e., a first body) 102 and an upper body (i.e., a second body) 104 portions that are coupled at a sealed interface. The valve body 101 defines an inlet 106, an outlet 108, and a flow path 110 fluidly connecting the inlet 106 and the outlet 108. The valve body 101 includes a bore 112 having variable dimensions that extends through the lower and upper body portions 102, 104 and houses the internal components of the control valve 100. In particular, a valve seat and seat support assembly 114 is disposed in the bore 112 of the body 101 between the lower and upper body portions 102, 104, and an actuator assembly 115 is disposed in the bore 112 of the upper body portion 104. The bore 112 also defines a throat 116, a spring chamber 118, and a piston chamber 120. In the illustrated example, the control valve 100 is a split-body valve with lower and upper body portions 102, 104. However, in another example, the valve body 101 may be an integrated valve body component.

The flow path 110 is defined between the inlet 106 and the outlet 108, and includes a first path 110A that is partially defined by the upper body portion 104, and a second path 1106 that is partially defined by the lower body portion 102. In the illustrated example, the first path 110A of the flow path 110 has an angled portion that is oriented at approximately 45° relative to the longitudinal axis A of the control valve 100. However, the flow path 110 may have a different contour and formation to provide different flow characteristics or flow profile.

Figure 3:
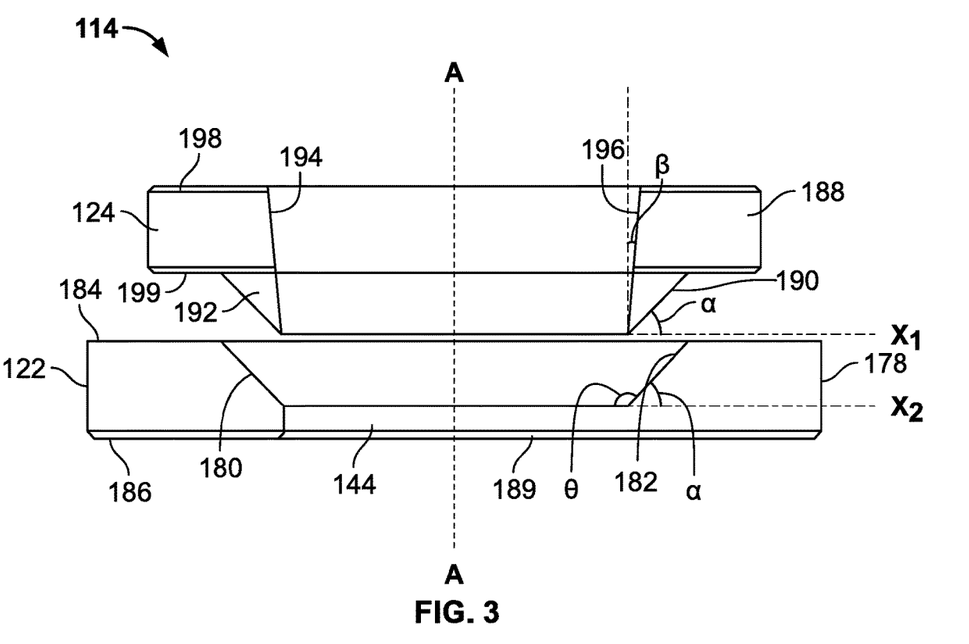
FIG. 3 is an exploded, cross-sectional side view of a first exemplary valve seat and seat support assembly of the first control valve of FIG. 2, and is assembled in accordance with the teachings of the present disclosure.

The valve seat and support assembly 114 is disposed within the bore 112 of the valve body 101, and, in particular, is mounted to the valve body 101 within the throat 116. The valve seat and support assembly 114 includes a valve seat 122 and a seat support 124 disposed between the lower and upper body portions 102, 104 of the valve body 101. As shown in FIGS. 2 and 3, a frustoconical portion of the seat support 124 is disposed within a cavity of the valve seat 122 such that the seat support 124 overlaps with the valve seat 122 when the seat support 124 is stacked in axial alignment and on top of the valve seat 122. To assembly, the frustoconical portion of the seat support 124 is inserted into the cavity defined by the valve seat 122. However, in another example, the frustoconical portion of the seat support 124 may instead be integrated into a retainer that holds and compresses the valve seat 122 in place within the bore 112 of the valve body 101.

The valve seat and seat support assembly 114 is securely mounted within the bore and to the throat 116 of the valve body 101. In particular, the valve seat 122 is positioned within a first annular groove 126 between the lower body portion 102 and the upper body portion 104, and the seat support 124 is positioned within a second annular groove 128 defined in the upper body portion 104. In some examples, the valve seat 122 is also partially received within a corresponding groove of the upper body 104.

The seat support 124 is a metallic material and the valve seat 122 is a different material, such as plastic, that comes into sealing engagement with a control element 136. The seat support 124 provides a rigid backing for the valve seat 122 to help the valve seat material withstand high compressive forces when the control valve is operating. In this example, the support 124 is a metal support, and the valve seat 122 is a plastic material such as, for example, Vespel, Teflon, Tefzel, and Polychlorotrifluoroethylene (PCTFE) materials. However, the seat support 124 and valve seat 122 may be made of any other type of material that is sufficient to withstand high compressive forces in a particular environment.

The control valve 100 includes the control element 136 disposed within the bore 112 of the valve body 101 and extending between the lower and upper body portions 102, 104. The control element 136 is configured to control fluid flow between the inlet 106 and the outlet 108 by moving axially relative to a longitudinal axis A of the valve body 101. The control element 136 includes a stem 138 operatively coupled to the actuator assembly 115 and a plug portion 140, which defines a seating surface 142 that is configured to engage with the valve seat 122 to close the valve 100. The control element 136 is movable relative to the longitudinal axis A between an open position, in which the seating surface 142 is spaced away from an inner portion 144 of the valve seat 122 (FIG. 3), and a closed position, in which the seating surface 142 engages the inner portion 144 of the valve seat 122.

In this example, the control element 136 defines a fluid pathway formed in the valve stem 138 (i.e., a first flow path 146) and in the plug portion 140 (i.e., a second flow path 148). The flow paths 146, 148 of the control element 136 are fluidly coupled to provide fluid communication between the spring chamber 118 and a port 150 defined in the lower body 102. As a result, fluid may pass from the spring chamber 118 via the flow path 146 in the stem 138 and through the flow path 148 of the plug portion 140 to vent to the atmosphere via the port 150. The lower body 102 also includes passages 152, 154 that provide fluid communication between the inlet 106 and the outlet 108, respectively, and the surrounding environment. The passages 152, 154 permit pressure or condensation to exit the control valve 100.

The actuator assembly 115 is housed in the upper body portion 104, and includes a spring 156, a piston 158, and a diaphragm 160 that work together to actuate the control element 136 between open and closed positions. The spring 156 is positioned within the spring chamber 118 of the upper body 104 and is contained between a spring seat 162 and a ledge 163 defined by the valve body 101 such as to bias the piston 158, and therefore the control element 136, upward relative to the orientation of the valve 100 of FIG. 2, and into the closed position. The spring seat 162 includes an aperture 164 sized to receive a portion of the stem 138, and a recess 165 sized to receive a head portion 166 of the valve stem 138.

As depicted in FIG. 2, the piston 158 is slidably disposed within the piston cavity 120 defined by the upper body portion 104 and a cap 170. The piston 158 includes a recess 172 that receives the spring seat 162 such that the piston 158 is operatively coupled to the spring 156. The diaphragm 160 includes a peripheral edge 174 that is clamped between the upper body portion 104 and the cap 170. A remainder of the diaphragm 160 extends across the piston chamber 120.

The cap 170 threadably engages a threaded opening of the upper body 104. The cap 170 additionally defines a threaded aperture 176 for threadably receiving a supply line (not shown) connected to a pneumatic supply. The position of the control element 136 within the control valve 100 can be controlled by introducing compressed air into the piston cavity 120. For example, in the absence of compressed air supplied to the cavity 120, the spring 156 biases the piston 158 into the position depicted in FIG. 2, which causes the seating surface 142 of the plug portion 140 to sealingly engage the valve seat 122 and close the valve 100. However, the introduction of compressed air through the aperture 176 increases the pressure above the piston 158, which then causes the piston 158 and the entire control element 136 to displace downward (i.e., in the C direction) relative to the orientation of the valve 100 depicted in FIG. 2. Accordingly, the seating surface 142 of the plug portion 140 disengages from the valve seat 122 and opens the valve 100 to allow fluid to flow therethrough.

In FIG. 3, the first exemplary valve seat and seat support assembly 114 of FIG. 2 is shown in greater detail. The valve seat 122 and the seat support 124 are axially aligned relative to the longitudinal axis A of the valve body 101. The valve seat 122 and the seat support 124 are operatively coupled so that the valve seat 122 and the seat support 124 matingingly engage when positioned within the bore 112 of the valve body 101. As shown in FIG. 3, the valve seat 122 and the seat support 124 are separable and may operatively couple by mating male and female components when the seat support 124 is stacked on top of the valve seat 122 (with respect to the orientation in FIG. 3). The seat support 124 supports the valve seat 122 and deters the valve seat 122 from deflecting, for example, when the control element 136 sealingly engages the sealing surface (i.e., an inner portion 144) of the valve seat 122.

Figure 4:
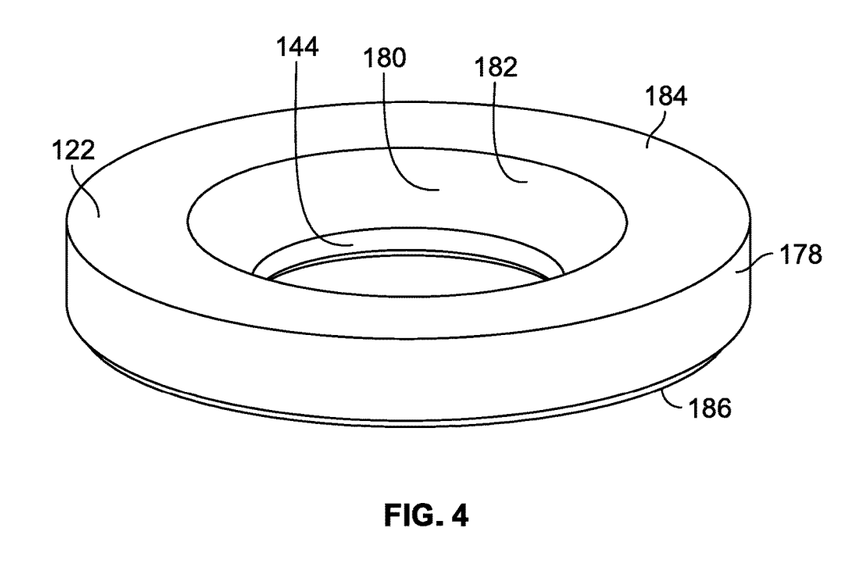
FIG. 4 is a perspective top view of a valve seat of the valve seat and seat support assembly of FIG. 3.
Figure 5:
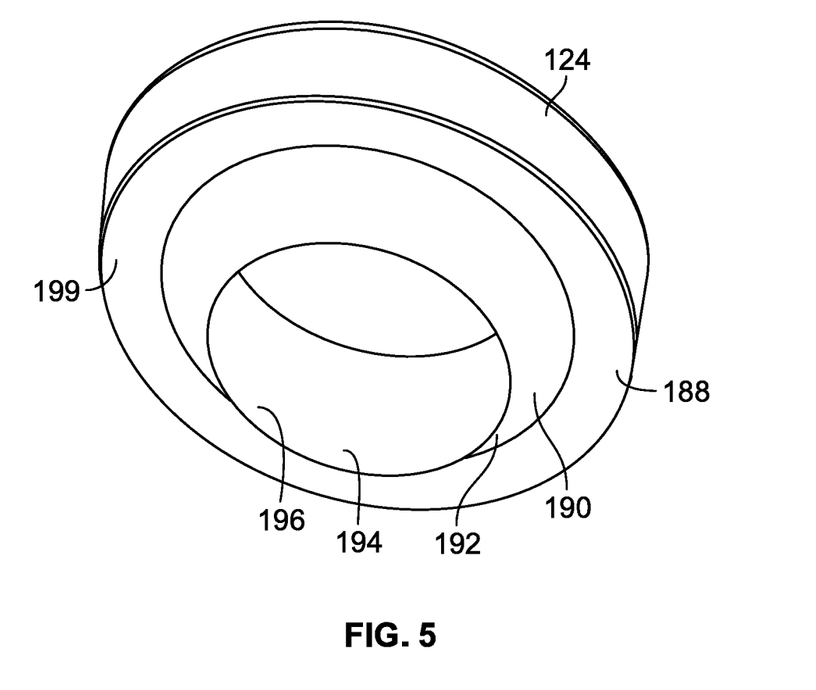
FIG. 5 is a perspective bottom view of a seat support of the valve seat and seat support assembly of FIG. 3.

The valve seat 122, as shown in FIGS. 3-5, is an annular ring, and includes an outer portion 178, the inner portion 144, and a bore 180 defining a sloped surface 182. The outer portion 178 is operatively coupled to the throat 112 of the valve body 101 and is clamped between the lower and upper body portions 102, 104 of the control valve 100. The sloped surface 182 is adjacent to the inner portion 144 such that the sloped surface 182 gradually terminates at the inner portion 144, which extends into the bore 112 of the valve body 101. The valve seat 122 includes a first parallel surface 184 and a second parallel surface 186. Turning briefly back to FIG. 2, the first parallel surface 184 of the valve seat is adjacent to a flange 188 of the seat support 184. As shown in FIGS. 3 and 4, the bore 180 of the valve seat 122 defines the sloped surface 182 and extends between the first parallel surface 184 and the second parallel surface 186. The inner portion 144 of the valve seat 122 includes a chamfered edge 189. In one example, the valve seat 122 is a Vespel material, however, the valve seat may be Teflon, Tefzel, or PCTFE material. In one example, the seat support 124 is a metallic material with a higher compressive strength than the material of the valve seat 122.

Figure 6:
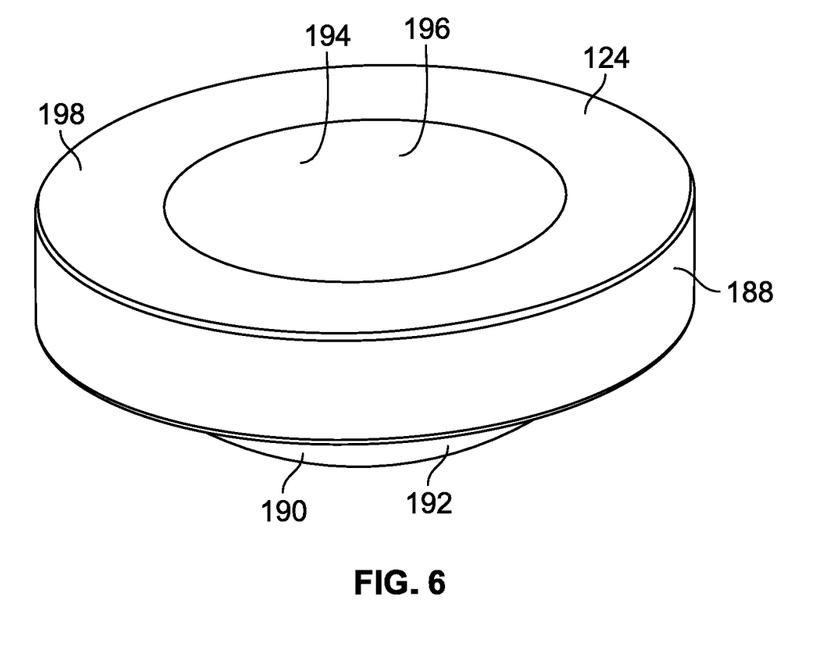
FIG. 6 is a perspective top view of the seat support of FIG. 5.

The seat support 124 of FIGS. 3, 5, and 6 also includes a sloped outer surface 190 disposed adjacent to the sloped surface 182 of the valve seat 122. More particularly, the seat support 124 includes the flange 188 and a protruding portion 192 defining the sloped outer surface 190 of the seat support 124 and extending from the flange 188. The seat support 124 also defines a bore 194 sized to receive the control element 136. The bore 194 has a slightly angled interior surface 196, and is oriented at an angle β (i.e., non-parallel) relative to the longitudinal axis A. The angled interior surface 196 of the bore 194 benefits fluid flow through the seat support 12. However, in other examples, the interior surface 196 may be parallel to the longitudinal axis A. The seat support 124 includes first and second parallel surfaces 198, 199 such that the first parallel surface 198 faces away from the valve seat 122 and the second parallel surface 199 rests against the first parallel surface 184 of the valve seat 122 when the valve seat 122 and the seat support 124 are coupled.

In the illustrated example of FIG. 3, the sloped outer surface 190 of the seat support 124 and the sloped inner surface 182 of the valve seat 122 are parallel. As such, each sloped surface 182, 190 of the valve seat 122 and seat support 124, respectively, are oriented at the same angle so that the sloped surfaces 182, 190 smoothly and evenly engage when the valve seat 122 and the seat support 124 are operatively coupled. The sloped outer surface 190 of the seat support 124 is oriented at an angle α relative to a horizontal axis $X_1$, which is substantially supplementary (i.e., angles substantially combine to 180 degrees) to an angle θ of the sloped inner surface 182 of the valve seat 122 relative to a horizontal axis $X_2$. For example, the sloped inner surface 182 of the valve seat 122 is orientated the angle θ relative to a horizontal axis (i.e., an axis perpendicular to the longitudinal axis A).

The protruding portion 192 of the seat support 124 extends into the bore 180 defined by the valve seat 122, and engages the inner portion 144 of the valve seat 122 to prevent the valve seat 122 from deforming under a high compressive load via media pressure and/or the control element 136. In this way, the protruding portion 192 of the seat support 124 provides a rigid back support to the valve seat 122, and namely, the inner portion 144 of the valve seat 122, to resist deformation of the valve seat 122 when engaged by the control element 136. In the illustrated example, the sloped outer surface 190 of the seat support 124 partially defines a conical or a frustoconical shape of the protruding portion 192. This frustoconical protruding portion 192 of the seat support 124 matches a cavity defined by the bore 180 of the valve seat 122 such that the valve seat 122 is sized and shaped to receive and engage the frustoconical protruding portion 192 of the seat support 124.

Figure 7:
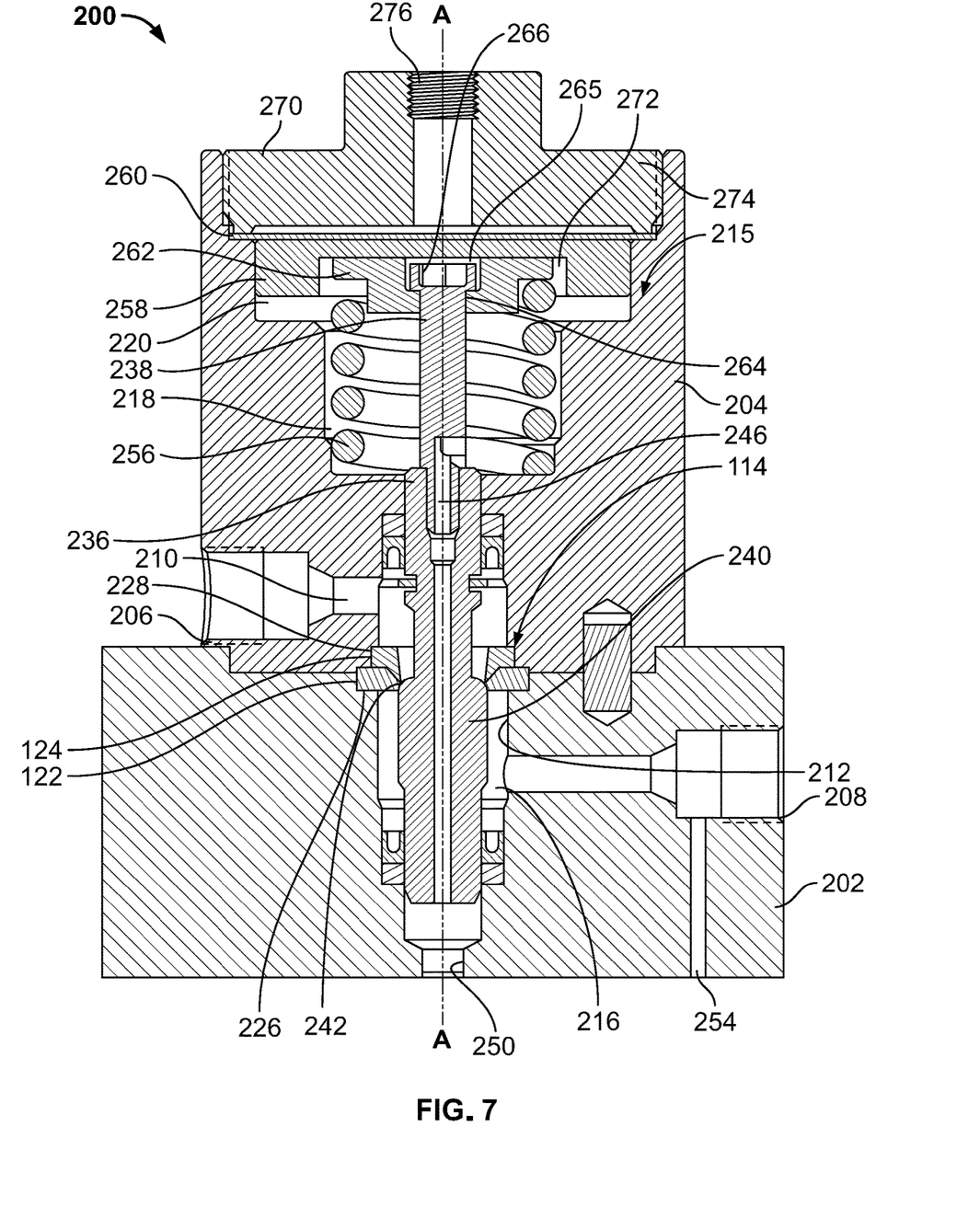
FIG. 7 is a cross-sectional side view of a second exemplary control valve constructed in accordance with the teachings of the present disclosure.

FIG. 7 illustrates a second exemplary control valve 200 constructed according to the teachings of the present disclosure. The second exemplary control valve 200 includes the first exemplary valve seat and seat support assembly 114. The second exemplary control valve 200 is similar to the control valve 100 of FIG. 2 discussed above, except the second exemplary control valve 200 has a different flow path 210 arrangement formed in lower and upper body portions 202, 204. Elements of the second exemplary control valve 200 which are similar to the elements of the first exemplary control valve 100 are designated by the same reference numeral, incremented by 100. A description of many of these elements is abbreviated or even eliminated in the interest of brevity. In other examples, the first exemplary valve seat and seat support assembly 114 may be incorporated in an Emerson Process Management VA, VG, or VT Series control valves.

Figure 8:
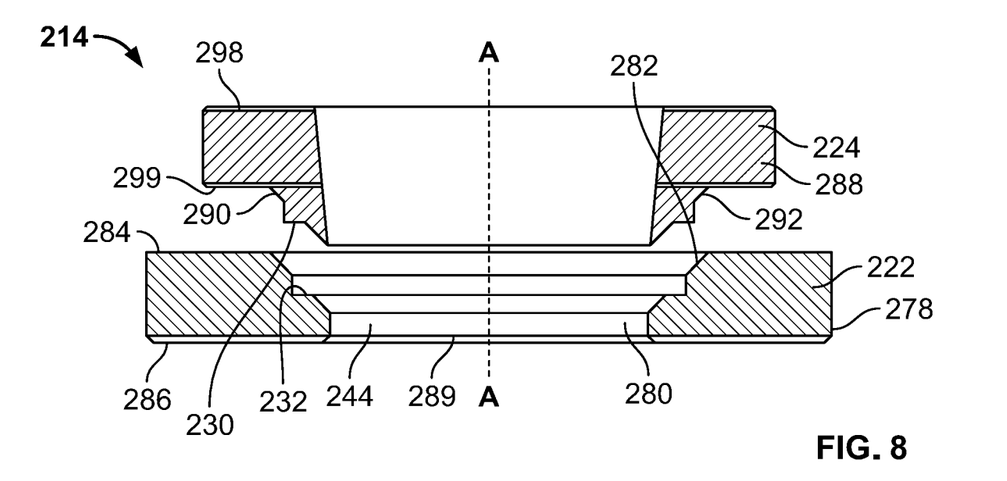
FIG. 8 is an exploded, cross-sectional side view of a second exemplary valve seat and seat support assembly constructed in accordance with the teachings of the present disclosure.

FIG. 8 illustrates a second exemplary valve seat and seat support assembly 214 constructed according to the teachings of the present disclosure. The second exemplary valve seat and seat support assembly 214 may replace the first exemplary valve seat and seat support assembly 114 to operate with the first or second exemplary control valves 100, 200 of FIGS. 2 and 7. The second exemplary valve seat and seat support assembly 214 is similar to the valve seat and seat support assembly 114 of FIG. 3 discussed above, except the second exemplary valve seat and seat support assembly 214 has a different mating engagement between a second exemplary valve seat 222 and a second exemplary seat support 224. Elements of the second exemplary valve seat and seat support assembly 214 which are similar to the elements of the first exemplary valve seat and seat support assembly 114 are designated by the same reference numeral, incremented by 100. A description of many of these elements is abbreviated or even eliminated in the interest of brevity.

In FIG. 8, the second exemplary valve seat and seat support assembly 214 includes sloped mating surfaces and a peg and notch engagement between the seat support 224 and the valve seat 222. The seat support 224 includes a peg 230 extending away from a sloped outer surface 290 of a protruding portion 292. The peg 230 may be an annular ring with a right-angled cross-sectional shape. The valve seat 222 includes a bore 280 defining a sloped inner surface 282 in which an annular notch 232 or groove is formed to receive the peg 230. In one example, instead of defining an annular ring 230 and an annular groove 232 in each of the seat support 224 and the valve seat 222, respectively, the protruding portion 292 of the seat support may provide a plurality of protruding pegs 230 spaced around a circumference of the protruding portion 292. Accordingly, the valve seat 222 may include a plurality of notches 232 such that each peg 230 is supported and received in a corresponding notch 232. The peg and notch engagement is merely an example geometry of a mating engagement between the two sloped surfaces 282, 290 of the valve seat 222 and seat support 224, respectively, and other examples may provide different shapes and arrangements to matingly engage the valve seat 222 and seat support 224.

Figure 9:
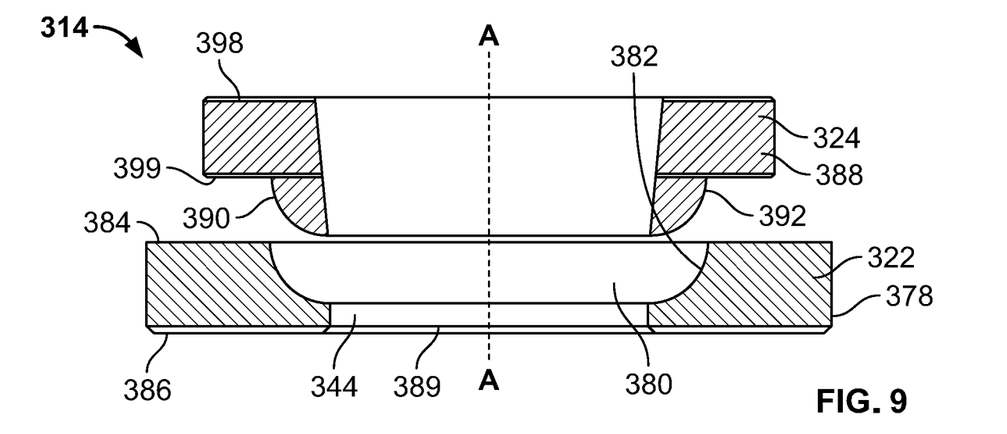
FIG. 9 is an exploded, cross-sectional side view of a third exemplary valve seat and seat support assembly constructed in accordance with the teachings of the present disclosure.
Figure 10:
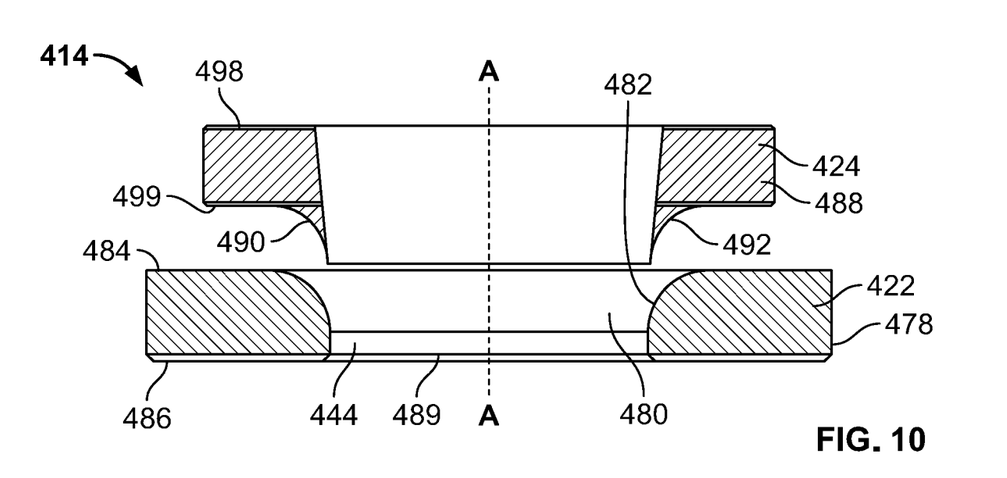
FIG. 10 is an exploded, cross-sectional side view of a fourth exemplary valve seat and seat support assembly constructed in accordance with the teachings of the present disclosure.

In FIGS. 9 and 10, a third and fourth exemplary valve seat and seat support assemblies 314, 414 are constructed according to the teachings of the present disclosure. The third and fourth exemplary valve seat and seat support assemblies 314, 414 may replace the first exemplary valve seat and seat support assembly 114 to operate with the first or second exemplary control valves 100, 200 of FIGS. 2 and 7. Each of the third and fourth exemplary valve seat and seat support assemblies 314, 414 is similar to the valve seat and seat support assembly 114 of FIG. 3 discussed above, except the third and fourth exemplary valve seat and seat support assemblies 314, 414 have a different mating engagements between each valve seat 322, 422 and respective seat support 324, 424. Elements of the third and fourth exemplary valve seat and seat support assemblies 314, 414, which are similar to the elements of the first exemplary valve seat and seat support assembly 114 are designated by the same reference numeral, incremented by 200 and 300, respectively. A description of many of these elements is abbreviated or even eliminated in the interest of brevity.

Turning first to FIG. 9, a protruding portion 392 of the seat support 324 has a sloped outer surface 390 having a curved slope. In particular, the curved slope 390 provides a concave outer surface 390 that is shaped to mate with a sloped inner surface 382 of the valve seat 322. In this case, the sloped inner surface 382 of the valve seat 322 is convex and has the same or similar radius of curvature to matingly engage with the protruding portion 392 of the seat support 324.

FIG. 10 illustrates a different arrangement between the seat support 424 and the valve seat 422. Specifically, a protruding portion 492 of the seat support 424 has a sloped outer surface 490 having a curved slope. In particular, the curved slope 490 provides a convex outer surface 490 that is shaped to mate with a sloped inner surface 482 of the valve seat 422. In this case, the sloped inner surface 482 of the valve seat 422 is concave and has the same or similar radius of curvature to matingly engage with the protruding portion 492 of the seat support 424.

The disclosed valve seat and seat support assemblies 114, 214, 314, and 414 are advantageously suited for use with cold temperature fluid control devices, control valves, and regulators, and can be implemented in existing valves and/or replace existing valve seats and seat supports to provide a more durable and long-lasting valve seat and seat support assembly. For example, any one of the disclose valve seat and seat support assemblies 114, 214, 314, and 414 may be incorporated in an Emerson Process Management VA, VG, or VT Series control valves. In high pressure applications, the valve seat and support assemblies 114, 214, 314, and 414 of the present disclosure can better withstand pressures that exceed the compressive properties of the valve seat material, which typically deforms with inadequate seat support. However, the additional backing of the disclosed seat support 124, 224, 324, and 424, and particularly, the sloped surfaces of the seat support 124 224, 324, and 424 and valve seat 122, 222, 322, and 422, improves performance of the valve seat 122, 222, 322, and 422 and limits seat formation of the valve seat material. The addition backing beneficially restricts the valve seat material from flowing or deforming inwards toward an inner diameter or inner portion 144, 244, 344, and 444 of the valve seat 122, 222, 322, and 422. The metallic material of the seat support 124, 224, 324, and 424 has high compressive strength properties, and more so than the valve seat material, and is shaped to specifically engage or bolster the inner portion 144, 244, 344, and 444 of the valve seat 122, 222, 322, and 422. With the added backing of the seat support 124, 224, 324, and 424, the valve seat 122, 222, 322, and 422 can withstand the compressive load of the media pressure and the control element 136, 236 so that the valve seat 122, 222, 322, and 422 does not deform under high compressive loads.

From the foregoing, it will be appreciated that the above disclosed fluid control device and assembly increase the ability of the example control valves 100, 200 to be used in colder temperatures (e.g., -400° F.) such as those associated with hydrogen filling stations. Specifically, the example control valves 100, 200 can be used in environments where standard polymer O-rings may fail. The example control valves 100, 200 are split body valves/manifold split valves having lower body portions 102, 202 (e.g., a first body) and upper body portions 104, 204 (e.g., a second body) such that each valve seat 122, 222, 322, and 422 may be securely disposed between the lower and upper body portions 102, 104, 202, 204.

The figures and description provided herein depict and describe preferred embodiments of a seat support and valve seat for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the valve seat and seat support. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A high pressure fluid control device, comprising:
    a valve body defining an inlet, an outlet, and a throat disposed between the inlet and the outlet, the valve body having an upper portion and a lower portion and defining a longitudinal axis;
    a valve seat disposed in the throat of the valve body, the valve seat engaging the lower portion of the valve body, the valve seat including an interior sloped surface, the valve seat coaxial with the longitudinal axis;
    a seat support disposed in the throat and engaging the upper portion of the valve body but not the lower portion of the valve body, the seat support disposed adjacent to and engaging the valve seat, the seat support including a sloped surface adjacent to the sloped surface of the valve seat, the seat support coaxial with the longitudinal axis, the sloped surface of the valve seat and the sloped surface of the seat support being parallel to one another; and
    a control element disposed in the valve body and including a stem and a seating surface, the control element being movable between an open position, in which the seating surface is spaced away from the valve seat, and a closed position, in which the seating surface engages the valve seat; and
    wherein the sloped surface of the seat support remains in engagement with all of the sloped surface of the valve seat and provides rigid support to the valve seat to resist deformation of the valve seat.

2. The fluid control device of claim 1, wherein the sloped surface of the seat support is oriented at an angle that is supplementary to an angle of the sloped surface of the valve seat.

3. The fluid control device of claim 1, wherein the valve seat is an annular ring defining a bore, a first parallel surface, and a second parallel surface, the bore defining the sloped surface extending between the first parallel surface and the second parallel surface.

4. The fluid control device of claim 1, wherein the seat support includes a flange portion and a protruding portion defining the sloped surface of the seat support and extending from the flange portion.

5. The fluid control device of claim 4, wherein the protruding portion extends into the bore defined by the valve seat.

6. A high pressure fluid control device, comprising:
a valve body defining an inlet, an outlet, and a throat disposed between the inlet and the outlet, the valve body having an upper portion and a lower portion and defining a longitudinal axis:
a valve seat disposed in the throat of the valve body, the valve seat engaging the lower portion of the valve body, the valve seat including an interior sloped surface, the valve seat coaxial with the longitudinal axis;
a seat support disposed in the throat and engaging the upper portion of the valve body but not the lower portion of the valve body, the seat support disposed adjacent to and engaging the valve seat, the seat support including a sloped surface adjacent to the sloped surface of the valve seat, the seat support coaxial with the longitudinal axis; and
a control element disposed in the valve body and including a stem and a seating surface, the control element being movable between an open position, in which the seating surface is spaced away from the valve seat, and a closed position, in which the seating surface engages the valve seat;
wherein the sloped surface of the seat support remains in engagement with the sloped surface of the valve seat and provides rigid support to the valve seat to resist deformation of the valve seat; and
wherein the seat support includes a flange portion and a protruding portion defining the sloped surface of the seat support and extending from the flange portion, and further wherein the protruding portion has a concave surface that is shaped to mate with the sloped surface of the valve seat, the sloped surface of the valve seat being convex.

7. A high pressure fluid control device, comprising:
a valve body defining an inlet, an outlet, and a throat disposed between the inlet and the outlet, the valve body having an upper portion and a lower portion and defining a longitudinal axis:
a valve seat disposed in the throat of the valve body, the valve seat engaging the lower portion of the valve body, the valve seat including an interior sloped surface, the valve seat coaxial with the longitudinal axis;
a seat support disposed in the throat and engaging the upper portion of the valve body but not the lower portion of the valve body, the seat support disposed adjacent to and engaging the valve seat, the seat support including a sloped surface adjacent to the sloped surface of the valve seat, the seat support coaxial with the longitudinal axis; and
a control element disposed in the valve body and including a stem and a seating surface, the control element being movable between an open position, in which the seating surface is spaced away from the valve seat, and a closed position, in which the seating surface engages the valve seat;
wherein the sloped surface of the seat support remains in engagement with the sloped surface of the valve seat and provides rigid support to the valve seat to resist deformation of the valve seat; and
wherein the seat support includes a flange portion and a protruding portion defining the sloped surface of the seat support and extending from the flange portion, and further wherein the protruding portion has a convex surface that is shaped to mate with the sloped surface of the valve seat, the sloped surface of the valve seat being concave.

8. The fluid control device of claim 1, wherein the seat support includes a bore sized to receive a portion of the control element, the bore of the seat support being non-parallel relative to the longitudinal axis.

9. The fluid control device of claim 1, wherein the seat support is a metallic material and the valve seat is a different material than the seat support.

10. The fluid control device of claim 1, wherein the valve seat is Vespel.

11. The fluid control device of claim 1, wherein the valve body includes a first body portion and a second body portion, wherein the valve seat is mounted between the first body portion and the second body portion.

12. A valve seat assembly for a fluid control device having a valve body, the assembly comprising:
a valve seat including first and second parallel exterior surfaces and an interior surface defining a bore with a sloped surface, the bore extending from the first parallel exterior surface to the second parallel exterior surface; and
a seat support coaxial with the valve seat along a longitudinal axis, the seat support having a sloped surface adjacent to the sloped surface of the valve seat, the seat support contacts the first parallel exterior surface of the valve seat to prevent the valve seat from deforming under a compressive load;
the sloped surface of the valve seat being angled at a first angle and the sloped surface of the seat support being angled at a second angle equal to the first angle;
wherein a lower portion of the valve seat is arranged to engage a lower portion of the valve body and an upper portion of the valve seat engages the seat support such that the valve seat is secured between the lower portion of the valve body and the seat support with all of the sloped surface of the valve seat being supported by the sloped surface of the seat support;
wherein the valve seat and seat support are configured to operatively couple to the valve body such that a portion of the valve seat extends into a bore of the valve body, and wherein a valve stem is adapted to slidably couple with the valve seat and the seat support, the valve stem operatively coupled to a control element having a seating surface, the seating surface arranged to engage with the valve seat.

13. The valve seat assembly of claim 12, wherein the sloped surface of the seat support is oriented at an angle that is supplementary to an angle of the sloped surface of the valve seat.

14. The valve seat assembly of claim 12, wherein the seat support includes a bore sized to receive a portion of the control element, the bore being non-parallel to the longitudinal axis.

15. The valve seat assembly of claim 12, wherein the seat support includes a flange portion and a protruding portion defining the sloped surface of the seat support and extending inwardly relative to the longitudinal axis from the flange portion.

16. The valve seat assembly of claim 15, wherein the protruding portion extends into the bore defined by the valve seat.

17. The valve seat assembly of claim 12, wherein the seat support is a metallic material and the valve seat is a different material than the seat support.

\* \* \* \* \*

UNITED STATES PATENT AND TRADEMARK OFFICE
CERTIFICATE OF CORRECTION

PATENT NO. : 11,566,712 B2
APPLICATION NO. : 16/961999
DATED : January 31, 2023
INVENTOR(S) : Jacob T. R. Renollett et al.

It is certified that error appears in the above-identified patent and that said Letters Patent is hereby corrected as shown below:

In the Specification

At Column 4, Line 66, "1106" should be -- 110B --.

At Column 6, Line 53, "matingingly" should be -- matingly --.

At Column 10, Line 1, "F.)" should be -- F) --.

In the Claims

At Column 11, Line 12, "axis:" should be -- axis; --.

At Column 11, Line 46, "axis:" should be -- axis; --.

Signed and Sealed this
Sixth Day of February, 2024

*Katherine Kelly Vidal*
*Director of the United States Patent and Trademark Office*